United States Patent [19]

Fishler et al.

[11] 4,404,297

[45] Sep. 13, 1983

[54] INTUMESCENT FIRE RETARDANT COMPOSITIONS

[75] Inventors: Theodor Fishler; Manny Ravey; Leonard M. Shorr, all of Haifa, Israel

[73] Assignee: Bromine Compounds Ltd., Beer-Sheva, Israel

[21] Appl. No.: 456,344

[22] Filed: Jan. 7, 1983

[30] Foreign Application Priority Data

Feb. 8, 1982 [IL] Israel .................................. 64952

[51] Int. Cl.³ .............................................. C09K 3/28
[52] U.S. Cl. ...................................... 523/179; 521/85; 521/94; 521/906; 521/907; 524/140
[58] Field of Search .................... 523/179; 521/85, 94, 521/906, 907; 524/140

[56] References Cited

U.S. PATENT DOCUMENTS 2,880,182  3/1959  Weissert ............................. 521/907
2,880,183  3/1959  Weissert ............................. 521/106

OTHER PUBLICATIONS

Chem. Abstracts, 86, p. 18765.

*Primary Examiner*—Morton Foelak
*Attorney, Agent, or Firm*—Browdy & Neimark

[57] ABSTRACT

The present invention relates to intumescent fire retardant compositions for polymers such as olefin polymers, polyester resins, polyurethane resins etc. According to the invention, the intumescent fire retardant compositions contain a thermolized product obtained from a system comprising $P_2O_5$ or a $P_2O_5$-precursor together with triethanolamine. The ratio between the constituents is between 0.5 to 2.0 parts by weight $P_2O_5$ to 1 part triethanolamine. The intumescent fire retardant compositions according to the present invention obviate the need for using of halogen-containing fire retardants which produce acid vapors during decomposition.

18 Claims, No Drawings

INTUMESCENT FIRE RETARDANT COMPOSITIONS

The present invention relates to fire retardant compositions for polymers. More particularly, the invention relates to intumescent fire retardant compositions for polymers.

Intumescent fire retardant compounds are characterized by their foaming and char-forming properties. Generally these compounds are based on three main components:
- a spumifier, which is a source of gases or vapors in order to form the foam;
- a carbonifier, which is a source of pyrolytic carbon in order to form the char, and
- a catalyst, which serves to induce intumescence.

In addition to the above three main components, it is mentioned in the literature that other compounds such as organic halides and inorganic fillers are desirable to be incorporated. The organic halides are added in order to enhance the extinguishing properties, while the inorganic fillers are described to act as nucleating agents for ready production of the char when the compositions are exposed to high tempertures.

The phenomenon of intumescent fire retardance is based on the expansion of the reagents into a charred carbonaceous foam on heating. The charred foam is an insulator of low combustibility which at the same time retards the release of flammable gases from the heated mass.

Carbonifier components are represented by polyhydroxy compounds such as sugars, polyvinyl alcohol, pentaerythritol etc. These components provide the carbon for char and contribute to the evolution of gases.

Spumific components are selected from nitrogenous compounds such as urea, guanidine, dicyandiamide etc. In some cases they induce resinification in the thermolytic process. The compounds may also be utilized in their polymeric form.

The catalyst is generally an acidic material, or one which generates an acid component on pyrolysis. Commonly used substances in this category are phosphoric acid or polyphosphoric acid and typical examples of compounds which generate an acidic component, are ammonium phosphates, melamine phosphate, etc.

According to U.S. Pat. No. 3,810,862, there are claimed intumescent fire retardant compositions for polyolefins, which comprise essentially ammonium polyphosphate, dipentaerythritol and melamine. According to U.S. Pat. No. 3,936,416, intumescent fire retardant compositions for polypropylene are obtained by admixing ammonium polyphosphate with dipentaerythritol and thermal degassing of the mixture prior to its incorporation into the polypropylene.

Although the above prior art intumescent fire retardant compositions are quite successful in their application, they have as main disadvantage the high costs of production in view of the relatively expensive starting materials used.

It is an object of the present invention to provide intumescent fire retardant compositions for polymers. It is another object of the present invention to provide intumescent fire retardant compositions for polymers, wherein the production costs of the fire retardant system are substantially reduced utilizing inexpensive starting materials. Thus the invention consists of intumescent fire retardant polymer compositions characterized by the presence of a thermolized product obtained from a system comprising $P_2O_5$ or a $P_2O_5$-precursor together with triethanolamine, the weight ratio of the components in said system being between 0.05 to 2.0 parts $P_2O_5$ to 1 part triethanolamine. It has been unexpectedly found, that in intumescent compositions triethanolamine can serve either as a spumifier or a carbonifier or can accomplish both functions at the same time. Thus triethanolamine in combination with a catalyst such as $P_2O_5$ or a suitable $P_2O_5$—precursor after thermolysis will produce an effective intumescent fire retardant when admixed with the polymer. The $P_2O_5$ catalyst can be incorporated either as a powder of $P_2O_5$ or preferably from the handling point of view in the form of phosphoric acid or its salts which by thermal decomposition will produce the $P_2O_5$. Examples of preferred $P_2O_5$-precursors are: ammonium phosphates, polyphosphoric acids or their amine or ammonium salts, organic phosphates, pyrophosphoric acid or its salts etc. Sometimes it will be desirable to add to the fire retardant system according to the present invention, other compounds known to be useful in fire retardant compositions such as melamine, pentaerythritol, aluminum sulfate, borax, antimony salts etc. Also the compositions may contain additives such as UV stabilizers, pigments, antistatic agents etc. In selecting such additives, a person skilled in the art will understand that they should not have a negative effect with respect to char formation and with respect to flame retardancy.

Ethanolamines are relatively inexpensive reagents produced in large amounts for various uses. They are also known to be utilized in the field of fire retardants and extinguishers. Thus for instance, according to Chemical Abstracts 86, 18765, the preparation of cleaning and fire proofing; compositions are described which contain triethanolamine, a detergent and fireproofing agent such as diammonium phosphate, ammonium sulfamate or a reaction product of urea and phosphoric acid. It is claimed that when said mixture is used as a carpet shampoo, it leaves a fire retardant film on the carpet fibers. Fire proofing compositions for fabrics, paper or cellular polyethylene were obtained (C.A. 87, 169, 218) by treating rayon fabric, paper or cellular polyethylene with a mixture containing a polyphosphoric acid salt, $Al_2(SO_4)_3$, borax-boric acid and an inorganic salt of an amino-alcohol such as nitrilotriethanol hydrobromide. It is mentioned that no significant difference in the smoke factor was found when the latter compound was omitted (0.086 versus 0.084). Fire-resistant phenol-formaldehyde resin compositions are described (C.A. 90, 104962) for impregnation of kraft paper in the manufacture of laminates. The compositions consists in the mixtures of phosphoric acid and ethanolamine, diethanolamine or triethanolamine in the ratio of 1:1-1.5. The inventors did not find any prior art reference which describes the use of a thermolized reaction product of triethanolamine and phosphoric acid or phosphoric acid precursor, neither as a fire retardant in general nor as an intumescent fire retardant in particular.

The evolution of gases which characterizes intumescent reagents, can be sometimes incompatible with the plastic fabrication process. For Example, upon their incorporation into thermoplastic resins, during fabrication at elevated temperatures, gases may be evolved prematurely, causing the formation of voids in the finished products. When this happens, the mechanical properties of the product suffer and its appearance may be unacceptable. In order to obviate said void formation, it is possible to utilize a partial thermolysis of the polymer with the intumescent fire retardant system according to the present invention i.e. heating at such a temperature that no significant void formation occurs during fabrication. Alternatively, the fire retardant systems containing triethanolamine are thermolized before incorporation in the plastic. An example of this is the case of polypropylene which is conventionally fabricated at 220°–240° C. Therefore, the compositions including the triethanolamine are first partially thermolized above this temperature as an integral part of the manufacturing process of these new intumescent fire retardants.

Examples of the polymers that can be rendered flame-retardant with the compositions according to the present invention include olefin homopolymers, olefin copolymers, polyester resins, acrylonitrile-butadiene-styrene resins, polyurethane resins, polystyrene resins and blends thereof. Examples of normally solid polyolefins suitable for use in this invention include polymers of mono-alpha-olefins having the general formula $CH_2=CHR$ wherein R represents hydrogen or a hydrocarbyl radical, having up to a total of 10 carbon atoms. Typical polymers are the homopolymers and copolymers of ethylene, propylene, butene-1, isobutylene, styrene etc. Such polymers can be prepared by any suitable process known in the art which normally produces a solid polyolefin.

The thermolysis step is an important step in the preparation of the fire retardant compositions according to the present invention. By thermolysis is meant the heating of the mixture under conditions in which the components are allowed to interact, allowing for the evolution of volatiles as formed. The temperature for said heating will vary according to the components. Generally, it will be at least 160° C. but preferably above 180° C. By this operation, it appears that the components interact with resinification giving rise to the beneficial property of the fire retardant composition.

The amount of the intumescent flame-retardant additive prepared as mentioned above, to be employed with the plastic material in order to obtain a satisfactorily flame resistant synthetic resin can vary widely, depending upon the resin, the use of additive components as enhancers and the desired degree of flame retardancy. In general, about 5 to about 70% by weight of the flame retardant additive is employed in the synthetic resin, or more preferably about 15 to about 40% by weight of the flame retardant additive. The ratio between the reagents to be utilized according to the present invention is very critical in order to obtain the desired intumescent effect.

The fire retardant effect according to the present invention is generally obtained with all types of polymers, but in particular outstanding results were obtained with polyolefins such as polypropylene and polyethylene and polyurethanes. The incorporation of other reagents known to enhance the spumific or carbonifying effect such as urea or pentaerythritol will further improve the intumescent effect. The particular selection of additional reagents will be rather a matter of costs and a person skilled will certainly be able to adapt the method according to the present invention for his specific case.

The Examples presented below are given only for a better understanding of the invention and no limitation whatsoever should be considered. Example 5 does not illustrate the invention and is presented only for comparison.

EXAMPLE 1.

An amount of 447 g (3 moles) of triethanolamine was introduced into a round bottomed flask and 98 g (1 mole) of phosphoric acid (92% wt.percent) were added dropwise with continuous stirring. A strong exothermic reaction was noted and the viscosity of the reaction mixture increased. The product obtained was thermolized for about 3 hours at a temperature in the range of 160°–180° C.

The thermolized product was tested as a fire retardant additive in a polyurethane polymer in the following manner: An amount of 13.6 g polyol IN 2530 (produced by Polyurethane Ltd., Haifa) w mixed with 14 g of the above thermolized compound, 8 g of FR 550 (an active brominated compound, produced by Bromine Compounds Ltd., containing about 50% by wt. Br and having a OH number of about 350), 0.5 g catalyst mix (produced by Polyurethane Ltd.) and 7.4 g of Freon 11. The components were mixed vigorously and 36.4 g of diphenyl methane diisocyanate (MDI) were added and mixed for 10 to 15 seconds.

The polyurethane foam obtained was post-cured at room temperature overnight. It was rated as non-burning according to ASTM D-1692-16. A comparative test carried out under the same conditions with the omission of the thermolized product obtained according to the present invention, was rated only self-extinguishing by this test.

EXAMPLE 2.

An amount of 274 g of melamine phosphate was mixed with 100 g of triethanolamine in a Waring blender and then thermolized at 300° C. for about 30 minutes. The mixture lost about 25% by weight. After grinding it appeared as a brown powder. The powder was admixed with polypropylene (30 parts by wt. powder to 70 parts polypropylene). Pressed specimens of this composition were found to posses an LOI of 26.6–26.8. The polypropylene itself, in the absence of the powdered product obtained according to the present invention, had an LOI of only 17.6.

EXAMPLE 3.

An amount of 14.9 g (0.1 mole) of triethanolamine was mixed with 0.074 moles of pentaerythritol and 0.1 mole of phosphoric acid (92% by wt). The mixture became hard but melted upon heating. After cooling, the mixture was crushed and thermolized at 250° C. for about 30 minutes. The loss in weight was about 16%. The brown product obtained was ground and mixed with an unsaturated polyester resin, based on maleic and phthalic anhydrides and propylene glycol (Fibreplast 555, produced by Fibreplast Ltd. Haifa) at two concentrations of 15% and 30%. The mixtures were cured at room temperature and post cured at 80° C. for about 24 hours. The products were found to posses LOI values of 22.8 (with 15% of the thermolized compound) and of 26.2 (with 30% of the thermolized compound). A comparative test carried out in the absence of the thermolized compound yielded specimens which had an LOI of only 18.8.

EXAMPLE 4.

Substantially the same results were obtained when the equivalent amount of $P_2O_5$ was substituted for the 92% phosphoric acid used in Example 3.

EXAMPLE 5.

Example 2 was repeated with the omission of the thermolysis step. Upon pressure molding the composition with polypropylene, voids formed in the specimens due to the evolution of vapors during fabrication. Such materials containing voids are unacceptable.

EXAMPLE 6.

An amount of 5 g of the thermolized product of Example 1, was mixed with 15 g of Fibreplast 555 (produced by Fibreplast Ltd. Haifa) which was polymerized with 8 drops of cobalt octanoate (as accelerator) and 12 drops of methylethyl ketone peroxide (as initiator). Curing was done at 80° C. for four hours. The product had an LOI of 22.7 (the blank was only 18.8).

EXAMPLE 7.

The experiment as in Example 2 was repeated, except that the amount of melamine phosphate taken was increased to 630 g. The LOI of the final product at the same loading of fire retardant was in this case 27.1.

EXAMPLE 8.

The following mixture was thermolized at 300° C. for 30 minutes:

| | |
|---|---|
| Ammonium polyphosphate (APP) | 130 g |
| Triethanolamine | 100 g |
| Melamine | 154 g |

The APP was obtained from Fertilizers & Chemicals Ltd. Haifa, Israel, and had the following composition: $P_2O_5$ (total) 63.9%; $P_2O_5$ (ortho) 28.3% (absolute); $P_2O_5$ (poly) 55.7% (from the total $P_2O_5$) and N (total) 11.9%.

The product obtained was ground to a powder and admixed with polypropylene in a ratio of 20 parts additive to 80 parts polypropylene. Platelets pressed from this mixture had an LOI of 24.5.

We claim:

1. Intumescent fire retardant synthetic organic polymer compositions containing a thermolized product wherein the thermolysis is carried out above 160° C., said product being obtained from a system comprising $P_2O_5$ or a $P_2O_5$—precursor together with triethanolamine, the weight ratio of the components in said system being between 0.05 to 2.0 parts $P_2O_5$ to 1 part triethanolamine.

2. Intumescent fire retardant compositions according to claim 1, wherein the weight ratio of the components in said system is 0.1 to 1 part $P_2O_5$ to 1 part triethanolamine.

3. Intumescent fire retardant compositions according to claim 1, wherein said $P_2O_5$—precursor is selected from a group consisting of phosphoric acid, polyphosphoric acid, pyrophosphoric acid or their ammonium salts and melamine phosphate.

4. Intumescent fire retardant compositions according to claim 1, wherein other reagents known to enhance the spumific and carbonifying effects are incorporated in said system.

5. Intumescent fire retardant compositions according to claim 4, wherein pentaerythritol is utilized as an enhancer of the carbonifying effect.

6. Intumescent fire retardant compositions according to claim 1, wherein brominated compounds are incorporated therein.

7. Intumescent fire retardant compositions according to claim 6, wherein said brominated compound is a brominated alcohol.

8. Intumescent fire retardant compositions according to claim 1, wherein the fire retardant system is admixed with the polymer and thermolized.

9. Intumescent fire retardant compositions according to claim 1, wherein the thermolized product is pulverized prior to its incorporation into the polymer.

10. The compositions according to claim 1, wherein every 100 parts of polymer contain about 5 to 70 parts of flame retardant composition.

11. The compositions according to claim 10, wherein said polymer is a polyolefin.

12. The compositions according to claim 11, wherein said polyolefin is polypropylene.

13. The compositions according to claim 11, wherein said polyolefin is polyethylene.

14. The compositions according to claim 10, wherein said polymer is polyurethane.

15. The compositions according to claim 10, wherein said polymer is an unsaturated polyester resin.

16. Intumescent fire retardant compositions according to claim 2 wherein said $P_2O_5$-precursor is selected from a group consisting of phosphoric acid, polyphosphoric acid, pyrophosphoric acid or their ammonium salts and melamine phosphate.

17. Intumescent fire retardant compositions according to claim 2, wherein other reagents known to enhance the spumific and carbonifying effects are incorporated in said system.

18. Intumescent fire retardant compositions according to claim 2, wherein brominated compounds are incorporated therein.

* * * * *